UNITED STATES PATENT OFFICE 2,659,191

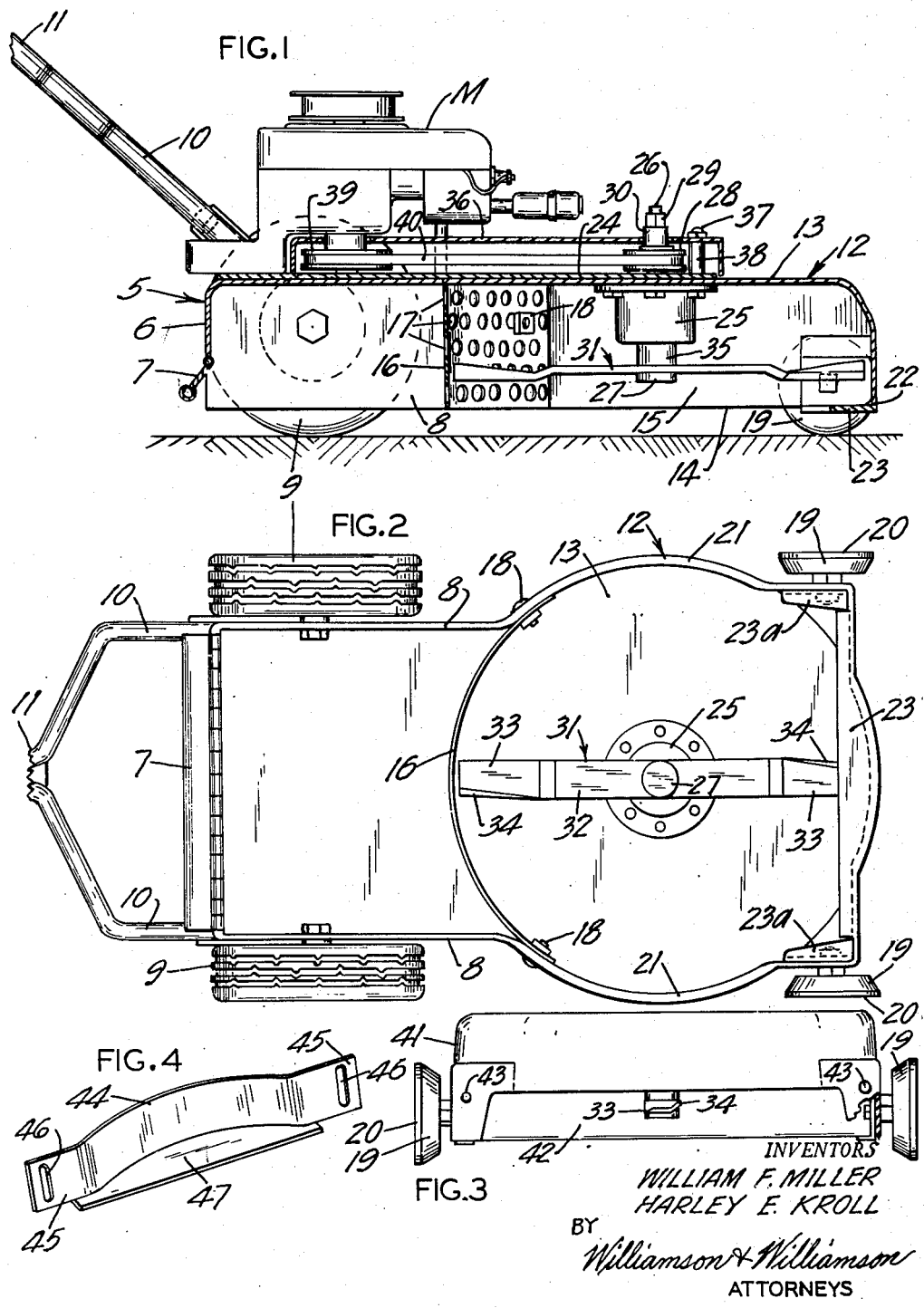

COMBINED GRASS MOWER AND LEAF MULCHER

William F. Miller and Harley E. Kroll, Minneapolis, Minn., assignors to Toro Manufacturing Corporation, Minneapolis, Minn., a corporation of Minnesota Application February 16, 1951, Serial No. 211,308

5 Claims. (Cl. 56—25.4)

This invention relates to a combined grass mower and leaf mulcher.

Various mechanisms have been devised for gathering leaves and mulching them for return of the comminuted material to the soil as fertilizer. Likewise, scores of grass mowers have been designed to mow grass and some have been constructed to mulch the same and return the comminuted grass to the soil, but none of these devices have been successful in simultaneously and efficiently accomplishing both operations. Grass mowers previously known will not gather and mulch the leaves efficiently and leaf mulchers previously known do an unsatisfactory grass mowing operation. Thus, it has always been necessary to have separate mechanisms in order to accomplish both these operations or at least to perform first one, then modify the device, and thereafter perform the other.

It is a general object of my invention to provide a novel and improved mechanism capable of substantially reducing the time, effort and materials previously required for cutting the grass, gathering the leaves, and comminuting both over a given area.

A more specific object is to provide a novel and improved mechanism capable of simultaneously and efficiently cutting grass, gathering leaves, and comminuting both.

A still more specific object is to provide a combined grass mower and leaf mulcher which will simultaneously gather up the leaves and cut the grass over which it passes, comminute both the grass and leaves, and return the same to the soil as fertilizer.

Another object is to provide a mechanism capable of performing in a single operation the cutting of grass, the gathering of leaves, and the concurrent comminution of both to thereby eliminate the need for performing each operation separately and for modifying the device used between the performance of each operation.

These and other objects and advantages of the invention will more fully appear from the following description made in the connection with the accompanying drawings, wherein like reference characters refer to the same or similar parts throughout the several views, and in which Fig. 1 is a longitudinal vertical sectional view of a combined grass mower and leaf mulcher embodying my invention;

Fig. 2 is a bottom plan view of the same structure shown in Fig. 1;

Fig. 3 is a front end elevational view of a modified form of the embodiment shown in Fig. 1; and Fig. 4 is a perspective view of the air current directing member provided to convert the structure shown in Fig. 3 from a grass mower into a combined grass mower and leaf mulcher.

One embodiment of my invention may include as shown in Figs. 1 and 2 an ambulant frame indicated generally as 5 and including a discharge hood 6 having a swinging deflector door 7 attached to its lower and rear edge. The discharge hood 6 has secured to its opposite sides 8 in any suitable manner for rotation a pair of wheels 9. Also secured to the rearward portions of the sides 8 is a pair of bracket arms 10 which converge to join with a handle member 11.

Rigidly connected to the frame 5 is a housing 12 of generally cylindrical shape. As shown, this housing has a closed top 13, a substantially open bottom 14 and arcuately shaped vertical side walls 15. The forward portion of the housing 12, as best shown in Fig. 2, is vertically disposed and substantially rectangular in shape. As shown, the rear portion 16 of this housing is formed of a removable arcuately shaped metal sheet which is provided with a plurality of apertures 17 formed therethrough. This apertured portion as shown is secured to the side walls by means of removable bolts 18 as best shown in Fig. 2, the apertures 17 constituting discharge passages for the housing. The opposite forward corners of the housing 12 are supported by a pair of freely rotating wheels 19 which are mounted thereon and which have their outer surfaces flat as at 20 to permit the machine to approach a wall or fence in very close proximity.

Secured to the lower edge 21 of the housing 12 across the forward side wall portion 22 is a narrow elongated air current directing flange 23. This flange 23 as shown best in Fig. 2 extends inwardly from the edge of the housing 12 and transversely to the direction of movement of the machine. A pair of ears 23a extend rearwardly from the flange to aid in directing the air currents upwardly. As shown in Figs. 1 and 2, the air current directing flange 23 may be formed integrally with the housing 12 or fixedly secured thereto by welding or some other suitable means.

Secured to the upper surface of the housing 12 and of the discharge hood 6 is a stiffener plate 24. Secured to the lower surface of the housing 12 and centrally thereof is a bearing 25. Extending through the bearing 25 and the stiffener plate 24 in both an upwardly and downwardly direction is a shaft 26 with a head 27. Keyed to the upper end of the shaft 26 is a pulley 28 which is prevented from longitudinal movement with respect to the shaft 26 by a lock nut 29 and a collar 30. Mounted on the shaft 26 directly above the head 27 is a cutter element indicated generally as 31. As shown, this cutter element consists of a knife 32 pierced in its medial portion for mounting on the shaft 26 and having its leading edges 33 sharpened at both ends. Its trailing edges 34 are bent upwardly to deflect the air upwardly and create a suction effect beneath the housing when the knife is rotated rapidly. The cutter element 31 is maintained in spaced relation from the bearing 25 by a collar 35. Thus it can be readily seen that the height of the cutter element may be readily adjusted by loosening the nut 29 and inserting an additional or longer collar between the bearing 25 and the cutter element.

A housing plate 36 houses the pulley 28 and is secured to the stiffener plate 24 and the housing 12 by any suitable means such as the bolt 37 separated by a collar 38. Mounted above the discharge hood 6 in any suitable manner is a gasoline motor indicated generally as M. This motor M has a drive pulley 39 which provides a direct power take-off to the pulley 28 by means of a V-belt 40.

Fig. 3 shows an embodiment of my invention very similar to that shown in Figs. 1 and 2 except that the forward wall portion of the housing 41 is cut away as at 42 and is provided with a bolt 43 on each of the forward corners. Fig. 4 shows the air current directing member which is provided to be utilized with this structure. It consists of an attachment flange 44 which is curved at its medial portion to conform with the curvature of the housing 41 and has a pair of straight attachment ends 45 with slots 46 formed therein. These slots 46 are adapted to receive the bolts 43 for securement of the attachment flange 44. Rigidly secured to the lower edge of the attachment flange is the air current directing flange 47 which extends inwardly toward the shaft disposed centrally of the housing.

In operation, the motor M drives the cutter element at high speed and the leading edges 33 of the cutter element cut the grass and comminute the leaves during its rotation. The high speed of the cutter element 31 causes the upwardly turned trailing edges 34 to create an upwardly directed draft and to draw the leaves over which the machine passes upwardly therewith. At the same time, the grass is drawn to an upright position so that an efficient cutting operation may be performed by the rapidly rotating leading edges 33. The upwardly directed air currents created by the cutter element 31 tend to spread when they reach the upper portion of the housing 12 and a substantial share of them are deflected to pass rearwardly through the apertures 17 of the rear side wall 16. The leaves and grass cut by the cutter element 31 are thus carried rearwardly until they either pass through the aperture 17 or are prevented from doing so by the same. If the particles have not been sufficiently comminuted, they will drop into the path of the rapidly rotating leading edges 33 to be again comminuted and drawn upwardly along with the air circulation. This procedure continues until the particles of leaves and straw have been comminuted sufficiently to be discharged rearwardly through the rear wall portion 16 and into the discharge hood 6. The swinging door 7 directs the air flow downwardly against the ground to insure the return of the comminuted material upon the soil from which the grass and leaves have been taken.

As pointed out above, machines previously known for cutting grass would not do an efficient leaf mulching operation. This is true because the air currents which are set up by such a rapidly rotating horizontal cutter element are such as to cause partially comminuted material to be discharged downwardly at the forward wall portion of the housing 12. I have found that by providing a small flange along the forward wall portion only of the housing, the air currents again will be directed upwardly to prevent the discharge of partially comminuted material ahead of the machine. I have also found that it is imperative that this flange extend only across the forward wall portion of the housing, for if such a flange is provided entirely around the lower edge of the housing 12 the machine will not do an efficient job of cutting the grass over which it passes. In other words, even though it would be possible to convert a machine such as is disclosed into a leaf mulcher by placing a flange entirely around the lower edge of the housing 12, such modification would terminate the machine's usefulness as a grass cutter unless the flange were removed prior to attempting to cut grass therewith. I have found that by providing a flange shaped and arranged substantially as shown, a machine of the type described will simultaneously and efficiently perform both the grass cutting and the leaf mulching operations.

It should be noted that the function of the flange 23 is not to bodily support the partially comminuted leaves. Its function, rather, is to redirect the air currents so that the air currents which normally descend along the forward wall portion of the housing 12 will be redirected upwardly to assist in the further drawing of leaves and grass into the path of the cutter element 31.

The embodiment shown in Figs. 3 and 4 is a slight modification of the embodiment shown in Figs. 1 and 2. The entire machine is made substantially the same except that the forward wall portion of the housing has been cut away so that, if desired, the operator may cut exceptionally tall grass or weeds more efficiently and may cut only the grass and not disturb the leaves, if any, which are upon the ground. Whenever the operator desires to perform both operations simultaneously, he may do so by attaching the attachment flange 44 by means of the bolts 43 to the forward portion of the machine.

It is understood, of course, that the mechanisms shown are adapted to be propelled over the surface of the ground by manual force exerted on the handle 11.

Thus it can be seen that I have provided a mechanism which will simultaneously cut the grass and comminute the leaves over which it passes in a single operation. My device eliminates entirely one of the operations normally required to accomplish the same results. At the same time, it obviates the need for separate equipment to perform these functions and it eliminates a substantial waste of time and materials.

It will, of course, be understood that various changes may be made in the form, details, arrangement and proportions of the various parts without departure from the scope of the present invention.

What we claim is:

1. In a combined grass mower and leaf mulcher, the combination of an ambulant frame, a housing of generally cylindrical shape mounted on said frame and having a substantially open bottom and closed top and substantially vertical side walls, said housing having vertically disposed forward and rear portions, the bottom of said housing being normally disposed a short distance above the ground, the rear portion of said housing having a plurality of relatively small discharge apertures formed therethrough, a cutter element mounted for rotation within said housing in a substantially horizontal plane on a vertical axis disposed centrally of said housing, said cutter element having a sharpened leading edge and an upwardly extending trailing edge and being of sufficient length to extend outwardly from its axis of rotation to positions in close proximity to the side walls of said housing and being adapted to be connected to a source of rotary power for rapid rotation whereby said trailing edge may create during rotation of said cutter element upwardly directed air currents to draw the grass and leaves upwardly into the path of said sharpened leading edge for efficient mowing and comminution of the same and to cause the comminuted material to be discharged through said apertures, and an air current directing member carried by said housing and disposed below said cutter element along the forward portion only of said housing and extending inwardly a short distance toward the center of said housing to redirect descending air currents formed within said housing and to prevent partially comminuted material from being carried outwardly beyond the confines of said housing and to permit said cutter element to simultaneously and effectively mow the grass and draw the leaves and cut grass within said housing for efficient comminution of both.

2. A combined grass mower and leaf mulcher comprising an ambulant frame, a shallow vertical housing of generally cylindrical shape mounted on said frame and having a substantially open bottom and closed top and substantially vertical side walls, said housing having vertically disposed forward and rear portions, the bottom of said housing being normally disposed a short distance above the ground, the rear portion of said housing being arcuately shaped and having a plurality of relatively small discharge passages extending therethrough, a cutter element mounted for rotation within said housing in a substantially horizontal plane below the major portion of said passages and on a vertical axis disposed centrally of said housing, said cutter element having a sharpened leading edge and an upwardly extending trailing edge and being of sufficient length to extend outwardly from its axis of rotation in close proximity to the side walls of said housing, mechanism connected to said cutter element for rotating the same at high speeds whereby said trailing edge may create upwardly directed air currents to draw the grass and leaves upwardly into the path of said sharpened leading edge for efficient mowing and comminution of the same and to cause the comminuted material to be discharged through said passages, and an air current directing member carried by said housing and disposed along the forward portion only of said housing and below said cutter blade and extending inwardly a short distance toward the center of said housing to redirect descending air currents formed within said housing and thereby prevent partially comminuted material from being carried outwardly beyond the confines of said housing and to permit said cutter element at the same time to effectively mow the grass and draw the leaves and cut grass within the interior of said housing for efficient comminution of both.

3. In a combined grass mower and leaf mulcher, the combination of an ambulant frame, a shallow housing of generally cylindrical shape carried by said frame and having a substantially open bottom and closed top and substantially vertical side walls, said housing having an arcuately vertically disposed rear portion and a vertically disposed forward portion, the bottom of said housing being normally disposed a short distance above the ground, the rear portion of said housing having a plurality of relatively small discharge passages extending therethrough, a cutter element mounted for rotation within said housing in a substantially horizontal plane at a level below at least some of said passages and on a vertical axis disposed centrally of said housing, said cutter element having a sharpened leading edge and an upwardly extending trailing edge and being of sufficient length to extend outwardly from its axis of rotation to positions in close proximity to the side walls of said housing and being adapted to be connected to a source of rotary power for rapid rotation whereby said trailing edge may create upwardly directed air currents to draw the grass and leaves upwardly into the path of said sharpened leading edge for efficient mowing and comminution of the same and to cause the comminuted material to be discharged through said passages, and a relatively narrow elongated, substantially horizontal flange mounted on said housing and disposed along the forward portion only of said housing below said cutter element and extending inwardly toward the center of said housing and transversely to the direction of movement of said frame and redirecting descending air currents formed within said housing and preventing partially comminuted material from being carried outwardly beyond the confines of said housing and enabling said cutter element to simultaneously and efficiently mow the grass and draw the leaves and cut grass within said housing for efficient comminution of both.

4. A combined grass mower and leaf mulcher, comprising an ambulant frame, a shallow vertical housing of generally cylindrical shape mounted on said frame and having a substantially open bottom and closed top and substantially vertical side walls, said housing having vertically disposed forward and rear portions, the bottom of said housing being normally disposed a short distance above the ground, the rear portion of said housing having a plurality of relatively small discharge passages formed therethrough, a cutter element mounted for rotation within said housing in a substantially horizontal plane below the major portion of said discharge passages and on a vertical axis disposed centrally of said housing, said cutter element having a sharpened leading edge and an upwardly extending trailing edge and being of sufficient length to extend outwardly from its axis of rotation to positions in close proximity to the side walls of said housing, mechanism connected to said cutter element for rotating the same at high speed whereby said trailing edge may create upwardly directed air currents to draw the grass and leaves upwardly into the path of said sharpened leading edge for efficient mowing and comminution of the same and to cause the comminuted material to be discharged through said passages, and an air current-directing flange mounted on said housing and disposed along the forward portion only of said side walls and below said cutter element and extending inwardly a short distance toward the center of said housing to redirect descending air currents formed within said housing and to prevent partially comminuted material from being carried outwardly therewith beyond the confines of said housing and to permit said cutter element to simultaneously and efficiently mow the grass and draw the leaves and cut grass within said housing for efficient comminution of both.

5. In a combined grass mower and leaf mulcher according to claim 1, said air current directing member comprising a narrow elongated flange, and a pair of ears carried by said housing at the ends of and substantially coplanar with said flange and extending normally rearwardly from the flange to aid in directing the air currents upwardly.

WILLIAM F. MILLER.
HARLEY E. KROLL.

References Cited in the file of this patent

UNITED STATES PATENTS

| Number | Name | Date |
|---|---|---|
| 2,198,526 | Cockburn | Apr. 23, 1940 |
| 2,232,671 | Loder | Feb. 18, 1941 |
| 2,242,922 | Poynter | Nov. 20, 1949 |
| 2,489,730 | Soenksen | Nov. 29, 1949 |
| 2,491,544 | Arkenberg | Dec. 20, 1949 |
| 2,538,643 | Gregory | Jan. 16, 1951 |

FOREIGN PATENTS

| Number | Country | Date |
|---|---|---|
| 566,318 | Great Britain | Dec. 21, 1944 |